United States Patent
Thibaut

(10) Patent No.: US 9,356,818 B2
(45) Date of Patent: May 31, 2016

(54) METHOD AND COMPUTING DEVICE FOR PACKET CLASSIFICATION

(71) Applicant: Stimpfling Thibaut, Montreal (CA)

(72) Inventor: Stimpfling Thibaut, Montreal (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 98 days.

(21) Appl. No.: 14/067,239

(22) Filed: Oct. 30, 2013

(65) Prior Publication Data

US 2015/0117450 A1  Apr. 30, 2015

(51) Int. Cl.
| | |
|---|---|
| H04L 29/06 | (2006.01) |
| H04L 12/721 | (2013.01) |
| H04L 12/741 | (2013.01) |
| H04L 12/753 | (2013.01) |
| H04L 12/715 | (2013.01) |

(52) U.S. Cl.
CPC ............ *H04L 29/0653* (2013.01); *H04L 45/38* (2013.01); *H04L 45/48* (2013.01); *H04L 45/54* (2013.01); *H04L 45/64* (2013.01); *H04L 45/74* (2013.01); *H04L 69/22* (2013.01)

(58) Field of Classification Search
CPC ..... H04L 47/2441; H04L 69/22; H04L 45/48; H04L 29/0653; H04L 45/38; H04L 45/54; H04L 45/64; H04L 45/74
See application file for complete search history.

(56) References Cited

U.S. PATENT DOCUMENTS

| | | | |
|---|---|---|---|
| 2002/0009076 A1* | 1/2002 | Engbersen et al. | 370/389 |
| 2004/0111420 A1* | 6/2004 | Hofstee et al. | 707/100 |
| 2013/0034100 A1* | 2/2013 | Goyal et al. | 370/392 |
| 2013/0232104 A1 | 9/2013 | Goyal et al. | |

OTHER PUBLICATIONS

Vamanan, et al., "EffiCuts: Optimizing Packet Classification for Memory and Throughput", SIGCOMM 2010, Sep. 3, 2010.*
Gupta et al., "Classifying Packets With Hierarchical Intelligent Cuttings", Micro, IEEE, Jan./Feb. 2000.*
Wenjun Li et al.: "Scalable Packet Classification Using Hybrid and Dynamic Cuttings"; Oct. 22, 2013; 5 pages.
Yeim-Kuan Chang et al.: "CubeCuts: A Novel Cutting Scheme for Packet Classification"; Mar. 26, 2012; 6 pages.
International Search Report for PCT/IB2014/065725, mailing date Feb. 25, 2015; 5 pages.
T. Stimpfling et al.: "Optimal Packet Classification Applicable to the OpenFlow Context", Jun. 18, 2013; 6 pages.
Huan Liu: "Efficient Mapping of Range Classifier into Ternary-CAM"; IEEE 2002; 6 pages.

(Continued)

*Primary Examiner* — Khaled Kassim
*Assistant Examiner* — Zhaohui Yang
(74) *Attorney, Agent, or Firm* — Ericsson Canada Inc.; Julie Dufort

(57) ABSTRACT

The invention relates to a method for packet classification and a computing device for executing the method. The method comprises the steps of analysing packet classification rules to obtain a plurality of categories of rules. The method comprises building a plurality of decision trees, one for each category of rules. The method comprises adding pre-processing information in a header of each leaf of the plurality of decision trees for use in relation with at least one field of a header of a packet, for selecting at least one rule for classification of the packet. The pre-processing information comprises at least one sub-rule for matching against a selected field of a packet header. The method further comprises steps for leaf traversal.

16 Claims, 12 Drawing Sheets

(56) References Cited

OTHER PUBLICATIONS

Thilan Ganegedara et al.: "FRuG: A Benchmark for Packet Forwarding in Future Networks" IEEE 2010; 8 pages.
Bo Xu et al.: "HSM: A Fast Packet Classification Algorithm"; IEEE 2005; 6 pages.
H. Jonathan Chao et al.: "High Performance Switches and Routers"; 2007; 634 pages.
Open Network Foundation: "Charter: Forwarding Abstractions Working Group" last modified on Apr. 4, 2013; 6 pages.
Nilay Vaish et al.: "Experiences in Co-designing a Packet Classification Algorithm and a Flexible Hardware Platform"; Sep. 7, 2011; 11 pages.
Google: "Inter-Datacenter WAN with centralized TE using SDN and OpenFlow" 2012; 2 pages.
David E. Taylor: "Survey and Taxonomy of Packet Classification techniques"; ACM Computing Surveys, vol. 37, No. 3, Sep. 2005; pp. 238-275.
Balajee Vamanan et al.: "EffiCuts: Optimizing Packet Classification for Memory and Throughput"; Aug. 30-Sep. 3, 2010; 12 pages.
Pankaj Gupta et al.: "Algorithms for Packet Classification"; Jan. 24, 2001; 29 pages.
OpenFlow Switch Specification, Version 1.0.0 (Wire Protocol 0x01); Dec. 31, 2009; 42 pages.
OpenFlow Switch Specification, Version 1.3.2 (Wire Protocol 0x04); Apr. 25, 2013; 131 pages.
David E. Taylor: "ClassBench: A Packet Classification Benchmark"; May 21, 2004; 37 pages.
Pankaj Gupta et al.: "Packet Classification on Multiple Fields"; Aug. 21, 2000; 14 pages.
Weirong Jiang et al.: "Large-Scale Wire-Speed Packet Classification on FPGAs"; Feb. 22-24, 2009; pp. 219-228.
Yaxuan (Diet al.: "Packet Classification Algorithms: From Theory to Practice"; IEEE 2009; pp. 648-656.
Sumeet Singh et al.: "Packet Classification Using Multidimensional Cutting"; Aug. 25-29, 2003; 12 pages.
Jeffrey Fong et al.: "ParaSplit: A Scalable Architecture on FPGA for Terabit Packet Classification"; Aug. 22-24, 2012; 8 pages.
Weirong Jiang et al.: "Scalable Packet Classification on FPGA" IEEE 2011; 13 pages.
Haoyu Song et al.: "ABC: Adaptive Binary Cuttings for Multidimensional Packet Classification"; IEEE, vol. 21, No. 1, Feb. 2013; pp. 98-109.
Stimpfling, T. et al.: Optimal Packet Classification Applicable to the Openflow Context; Jun. 2013; pp. 9 to 14.
Song, H et al.: "ABC: Adaptive Binary Cuttings for Multidimensional Packet Classification"; IEEE Transactions on Networkng, vol. 21, No. 1; Feb. 2013; pp. 98 to 109.

\* cited by examiner

| Byte per rule | acl | | fw | | ipc | |
|---|---|---|---|---|---|---|
| | small | large | small | large | small | large |
| 10k | 74,6 | 72,3 | 68,5 | 65,8 | 80,3 | 79,1 |
| 100 k | 78 | 85,6 | 67,4 | 66,9 | 75,8 | 79,6 |

FIGURE 2

| Depth | acl | | fw | | ipc | |
|---|---|---|---|---|---|---|
| | small | large | small | large | small | large |
| 10k | 3 | 2 | 3 | 4 | 2 | 2 |
| 100k | 3 | 3 | 3 | 3 | 3 | 3 |

FIGURE 3

| Average number of rules per leaf | acl | | fw | | ipc | |
|---|---|---|---|---|---|---|
| | small | large | small | large | small | large |
| 10k | 5,5 | 6,1 | 7,1 | 6 | 3,9 | 3,6 |
| 100k | 3,1 | 3,8 | 4,7 | 4,2 | 2,9 | 5,4 |

FIGURE 4

| Rule | Field A | Field B | Field C |
|---|---|---|---|
| 1 | 20:51 | 0:31 | 100:248 |
| 2 | 1023:1050 | 2:46 | 39:41 |
| 3 | 36:512 | 4:10 | 28:31 |
| 4 | 61:92 | 12:19 | 11:28 |
| 5 | 102:257 | 22:54 | 1:10 |
| 6 | 150:189 | 1:38 | 12:25 |

FIGURE 5A

| Group 1 | | Group 2 | |
|---|---|---|---|
| Rule | Field A | Rule | Field C |
| 1 | 20:51 | 3 | 28:31 |
| 2 | 1023:1050 | 6 | 12:25 |
| 4 | 61:92 | | |
| 5 | 102:257 | | |

FIGURE 5B

| Field A | Field B | Filed C |
|---|---|---|
| 412 | 12 | 29 |

FIGURE 6

|       | acl   |       | fw    |       | ipc   |       | Overflow |       |
|-------|-------|-------|-------|-------|-------|-------|----------|-------|
|       | small | large | small | large | small | large | small    | large |
| 10 K  | 17    | 15    | 12    | 13    | 11    | 10    | 11       | 11    |
| 100 K | 20    | 18    | 14    | 12    | 13    | 12    | 14       | 14    |

FIGURE 14

|       | acl | fw | ipc |
|-------|-----|----|-----|
| 10 K  | 12  | 7  | 35  |
| 100 K | 7.2 | 9  | 4   |

FIGURE 15

METHOD AND COMPUTING DEVICE FOR PACKET CLASSIFICATION

TECHNICAL FIELD

The present invention relates to packet classification and to a method of building and traversing a decision tree.

BACKGROUND

Packet Classification is a functionality required by networking devices in a wide range of contexts like Quality of Service (QoS), load balancing, security, monitoring and network traffic analysis. However, the average link speed is constantly increasing, while classification scheme performance tends to increase at a slower pace than that of the physical links. Thereby, classification remains a hot research topic.

Packet classification aims at matching incoming packets with one or multiples rules, contained in a rule set. Packet classification techniques known in the art are mainly linked to the classical 5-field context. Nonetheless, due to the significance of data centers and resources management, a global view of the system is required, from network equipment to servers. For that purpose, a solution called Software Defined Networking (SDN) has been proposed.

SDN is the next evolution in the networking field, as it uses a small processing granularity, and allows, for instance, to optimize the link utilization rate, get a unified view of the network fabric, improved failure handling, etc. Such improvements are drastically changing the shape of networking. Thereby, packet classification is deeply changed, and has to handle much more complex rules over a high number of fields. Moreover, the 5-tuple context doesn't match the trends and evolution in the networking field anymore. Software Defined Networking and more specifically, the OpenFlow protocol takes more and more importance in the literature, mainly due to its high degree of flexibility. By opposition to the classical 5-tuple context, SDN rule sets, with large sized flow entries are much more complex, due to the higher number of fields that can be used to classify a packet, and the ability to use masks on many fields. For instance, in version v1.0.0 of OpenFlow, up to 12 fields of a packet header can be used to classify a packet (See Table I).

TABLE I

| Open Flow fields used in V1.0.0 | | |
| --- | --- | --- |
| Field | Bits | Mask |
| Ingress Port | 6 | No |
| Ethernet destination MAC address | 48 | Yes |
| Ethernet source MAC address | 48 | Yes |
| Ethernet type | 16 | No |
| VLAN-ID from 802.1Q header | 12 | No |
| VLAN-PCP from 802.1Q header | 3 | No |
| IP source address | 32 | Yes |
| IP destination address | 32 | Yes |
| IP ToS bits | 6 | No |
| IP protocol | 8 | No |
| Transport source port/ICMP Type | 16 | No |
| Transport destination port/ICMP code | 16 | No |

Furthermore, when using Internet Protocol version 6 (IPv6) or Media Access Control (MAC) addresses as done in the latest evolution of SDN protocols, the rule size increases substantially. SDN evolution considers, on one hand, bigger fields and, on the other hand, a larger number of fields. Therefore, rules tend to be much more complex than was considered in the classical 5-tuple context. Such a context evolution has an impact on packet classification performance.

Although the number of functionalities offered to end users increases, limited progress has been achieved at the algorithm level. From an industrial point of view, Ternary Content Addressable Memory (TCAM) based solutions are widely used, while having many drawbacks, such as lack of flexibility and high power consumption. According to the Open Networking Foundation, the latest versions of protocols such as OpenFlow, used in the case of SDN, require support from powerful TCAM-like tables, but with more capability than available and announced hardware implementations. We are clearly facing a bottleneck by offering the end user a really high degree of flexibility without any optimized hardware available.

Many approaches have been considered in the literature to tackle the problem of packet classification, but many algorithms appear to under-perform or are not tailored for handling complex rules. We can categorize packet classification techniques in three main types: Decomposition Based, Decision Tree based, and pure hardware solutions, known as TCAM.

TCAM is a powerful memory, hardware, that offers O(1) time packet classification. To achieve such a high performance, TCAMs match, in parallel, each rule against the incoming packet header. TCAMs offer high performance but suffer from several drawbacks. Parallel match is extremely power consuming and TCAM chips are very costly. Further, supporting range based rules remains an open issue. Such bottlenecks tend to limit the use of TCAMs in current and future networking contexts.

One approach adopted in the literature to classify packets, named Decomposition Based, aims at separating the lookup process into multiple parallel reduced lookups, and then combines the results together. Some algorithms known in the art use this technique. Those algorithms can achieve good performance but suffer from a large memory requirement. Decomposition Based algorithms are not scalable, due mainly to the mentioned memory drawback and, consequently, are inappropriate to handle large classification tables.

Decision tree based algorithms are another avenue explored in literature to address the packet classification issue. Many known algorithms are using this approach, such as HiCuts, HyperCuts, and EffiCuts, which is a state of the art algorithm. Each of those algorithms divides the rule space (i.e. the rule-set) into subsets in an iterative fashion, until each subset contains fewer rules than a given threshold. An example of a tree building is shown in FIG. 1, using the HiCuts algorithm. The first step is to cut the rule space along the dimension which maximizes the differentiation between rules. So, a first cutting sequence, represented with the vertical lines, is done along the Field 1 direction, which generates four nodes. Three of those nodes contain fewer rules than the threshold value, set here to 2; those nodes correspond to leaves 1 to 3. Node 1 stores three rules, so another cutting sequence has to be completed, and is represented with a horizontal line. This process creates two more leaves 4 and 5. The decision tree is then finished.

The classification process is simply a tree traversal, from root node to leaves. The incoming packet header is compared with the rule space covered by each node, and then the position of the next child node to visit is computed based on information contained in each node. When a leaf is reached, each rule is matched against the packet header, and the matching rules are then selected. The process of packet classification is completed, and a new packet can be processed.

The first proposed tree-based packet-classification algorithm, HiCuts (in FIG. 1), generates a lot of rules replication as it creates a single decision tree, thus mixing together rules with very significant differences in size (which causes a lot of superposition).

HyperCuts was proposed as an evolution to HiCuts, with an aim at improving the convergence rate of the classification (thus, minimizing tree depth) while limiting the data structure size. To achieve this, the algorithm is based on multidimensional cuts and it includes techniques to minimize replication. These techniques produce better performance in terms of number of memory accesses, but scalability is poor.

EffiCuts aims mainly at striking the best compromise between the average number of memory accesses and the data set size, for the 5-tuple context. EffiCuts aims at reducing the overlap between rules in a classification table and reducing the variation in size of rule overlap, which leads to a high degree of rule replication caused by thin cuts. EffiCuts addresses this issue by partitioning the rule set and binning rules with different size patterns in different subsets. Each of these subsets is then associated with a dedicated decision tree. This method is called separable trees. However, the introduction of multiple trees adds extra memory accesses, which decrease throughput. This problem is solved in EffiCuts with selective tree merging. This method aims at merging selectively separable trees, mixing rules that are either small or large in at most one dimension.

Whereas HiCuts and HyperCuts cut the space covered by a node equally between each child node, EffiCuts introduces equi-dense cuts, in order to tackle the problem of ineffective nodes containing only a few rules occurring when separating dense parts and empty zones.

Additionally, EffiCuts introduces other optimization techniques like node collocation. Node collocation was proposed in order to reduce the overall number of memory accesses. It thus reduces considerably the memory usage compared to HyperCuts while having a low replication factor. On the other hand, these optimizations tend to increase the average number of memory accesses.

When there is more than one tree created by the decision tree based algorithm, a packet is classified by traversing each decision tree. In each tree, the process begins from the root node and this process is repeated until a leaf node is reached. Then, the packet is compared with every rule held in the leaf node.

The HyperCuts algorithm has been successfully implemented in Field-Programmable Gate Array (FPGA). While HyperCuts suffers from a high replication factor, optimizations can be included to tackle this issue and to address hardware tree traversal issues. One implementation known in the art can process up to 80 Gbps of bandwidth, for minimal packet size of 40 bytes, while using 5-tuple classification tables. However, a study evaluating its scaling properties conducted on OpenFlow-like rules (V1.0.0) concluded that it does not scale well when dealing with OpenFlow-like rules.

Other FPGA implementations use algorithms such as Hyper-Split or ParaSplit over HyperSplit with performances which can reach 123 Gbps for minimal packet size (64 bytes).

An alternative to FPGA implementation is to use an array of microprocessors. One implementation known in the art implemented EffiCuts on the Pipelined Look Up Grid (PLUG) platform. PLUG is a flexible lookup module platform designed to easily deploy new protocols in high-speed routers. Multiple modifications to implement EffiCuts have been added to the PLUG platform on both the hardware and the software side. Even then, this implementation can only support 33 Gbps of data bandwidth for minimal packet size.

The decision tree based algorithms described here mainly focus on decreasing the replication factor and accelerating the convergence to leaves. Optimizations are proposed on at least two fronts: before tree building and when generating tree nodes.

Decision tree based algorithms are implementable in hardware and offer decent performance in the classical 5-tuple context. In some cases, as shown above, some exploration was conducted with OpenFlow-like rule, but no optimizations were proposed, nor recommendations made, nor deep analysis performed.

SUMMARY

There is provided a method for packet classification comprising the step of analysing packet classification rules to obtain a plurality of categories of rules. The method further comprises a step of building a plurality of decision trees, one for each category of rules. The method also comprises the step of adding pre-processing information in a header of each leaf of the plurality of decision trees for use in relation with at least one field of a header of a packet, for selecting at least one rule for classification of the packet.

There is provided a computing device for packet classification comprising a processor and memory. The memory contains instructions executable by the processor whereby the computing device is operative to analyze packet classification rules to obtain a plurality of categories of rules. The computing device is further operative to build a plurality of decision trees, one for each category of rules. The computing device is also operative to add pre-processing information in a header of each leaf of the plurality of decision trees for use in relation with at least one field of a header of a packet, to select at least one rule for classification of the packet.

There is provided a computing device for packet classification. The computing device interacts with a server, and comprises an analyzing module for analyzing packet classification rules to obtain a plurality of categories of rules The computing device also comprise a building module for building a plurality of decision trees, one for each category of rules The computing device also comprises an adding module for adding pre-processing information in a header of each leaf of the plurality of decision trees for use in relation with at least one field of a header of a packet, to select at least one rule for classification of the packet.

BRIEF DESCRIPTION OF THE DRAWINGS

FIG. 2 illustrates the size of the data structure and more specifically the number of bytes per rule according to an exemplary embodiment.

FIG. 3 illustrates the maximum tree depth according to an exemplary embodiment.

FIG. 4 illustrates the average number of rules per leaf according to an exemplary embodiment.

FIG. 5A illustrates an example of rules contained in a leaf according to an exemplary embodiment.

FIG. 5B illustrates an example of two sets of sub-rules created according to an exemplary embodiment.

FIG. 6 illustrates an example of an incoming packet according to an exemplary embodiment.

FIG. 14 illustrates the number of memory accesses per tree for 12-tuples, obtained through experimental results, according to an exemplary embodiment.

FIG. 15 illustrates the number of memory accesses per tree for 5-tuples, obtained through experimental results, according to an exemplary embodiment.

DETAILED DESCRIPTION

Figure 1:
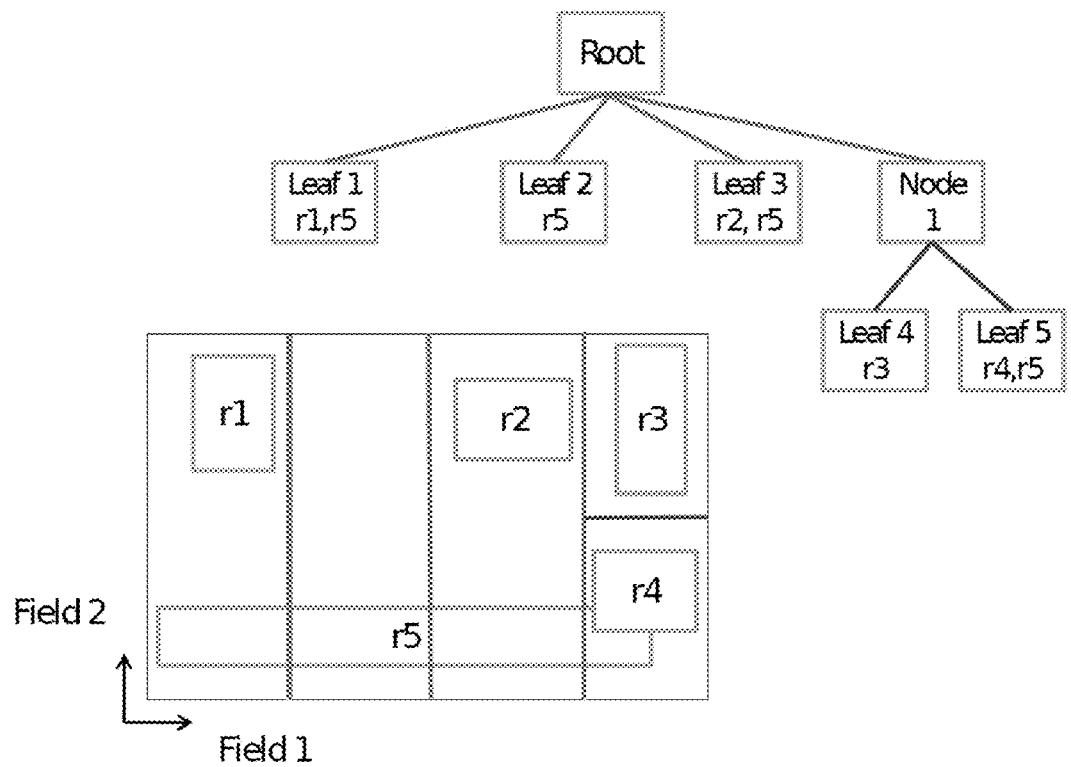
FIG. 1 illustrates an example of building a decision tree of the prior art.

The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions or functions to be performed by elements of a computer system or other hardware capable of executing programmed instructions. It will be recognized that the various actions could be performed by specialized circuits, by program instructions being executed by one or more processors, or by a combination of both. Moreover, the invention can additionally be considered to be embodied entirely within any form of computer readable carrier or carrier wave containing an appropriate set of computer instructions that would cause a processor to carry out the techniques described herein.

In some alternate implementations, the functions/acts may occur out of the order noted in the sequence of actions. Furthermore, in some illustrations, some blocks may be optional and may or may not be executed; these are generally illustrated with dashed lines.

As discussed in the background section, no optimizations have been presented by the known technique to optimize leaf traversal and improve on linear-time rule matching in the SDF context. EffiCuts, for example, has limiting factors when handling complex rules over a large number of fields. A new algorithm, called AcceCuts, will be presented hereinbelow. This new algorithm is optimized for handling complex rules, in the perspective of a hardware implementation.

AcceCuts aims to avoid reading unused data, which leads to wasted clock cycles, thereby minimizing the number of memory accesses and fetching in memory only useful information. AcceCuts aims also at using as little memory as possible, so it is designed to build a relatively compact data structure. Limiting the data structure size allows storing either bigger rules, or larger classification tables on the same memory chip.

The design of AcceCuts was led by two main criteria: on one hand, lowering the number of memory accesses by reading only the required information and, on the other hand, lowering the data structure size. It should be understood, however, that modifications can be devised that do not add overhead to tree traversal.

Let's start by analysing the data structure size. The total amount of memory used is difficult to appreciate; it is easier to consider the memory size per rule, defined as the total size of the data structure divided by the number of rules of the classifier. This "bytes per rule" measure helps to differentiate the size of the tree overhead from the rules. For instance, in the present context, if a rule weighs 41 bytes, a well performing algorithm has a "byte per rule" average close to this value. In such a case, the algorithm creates a limited number of nodes on-top of the leaves and, thus, is memory efficient.

In FIG. 2, the parameter bytes per rule, defined as the size of the data structure divided by the total number of rules held in the classifier, is used in order to observe the average amount of data created by the algorithm to reach a rule. In the figure, ACL stands for Access Control List, IPC stands for Internet Protocol (IP) Chain and FW stands for Firewall. Since a rule weighs 41 bytes, the data structure size generated by EffiCuts is quite higher than rule size (80% on average). On the other hand, EffiCuts is a state of the art algorithm as it generates a very limited replication ratio. Thus, the high memory consumption observed in FIG. 2 is not a consequence of a high replication factor, and is only linked to the large number of nodes in the trees built by EffiCuts. A person skilled in the art will understand that the algorithm has been tested with ACL, IPC and FW, but can apply to other types of scenarios.

FIG. 3 presents the maximal depth of trees generated by EffiCuts, which is pretty low with an average of 3. Under these circumstances, the convergence is really fast from root node to leaves. This is also reflected by measures of number of cuts done at each node level, which is a direct observation of the number of node created. In some cases, a node can have up to 131072 child-nodes. This creates trees with too many nodes, and consequently creates an over-weighted data structure.

Concerning the memory access overhead, some parts of the trees generate the highest number of memory accesses. It is know from the art that SDN-related rules increase drastically the number of memory accesses, but no details are given related to the cause of this behaviour. Different causes can lead to a high number of memory accesses: deep tree, leaf traversal, or both.

Table II provides the notation used throughout this description.

TABLE II

Notation used for AcceCuts

| Notation | Detail |
| --- | --- |
| $F_{il}$ | A specification of a rule on the i-th header field, for the l-th rule |
| $R_i$ | i-th rule of the rule set |
| $s(R)$ | Size of a rule contained in the rule set |
| D | Number of field used |
| w | Memory bus width |
| $L_j$ | The j-th leaf of the tree |
| $nr(L_j)$ | The number of rules covered by the leaf $L_j$ |

TABLE II-continued

Notation used for AcceCuts

| Notation | Detail |
|---|---|
| $S_{ij}$ | A set of the Leaf $L_j$ on the i-th header field |
| $pm_k$ | Number of positive match for a packet k |
| b-inth | Maximum number of rules in a leaf |
| c | Cost of a comparaison operation with a $F_i$ and a packet. |
| $\|S \cdot j\|$ | Number of set in the leaf $L_j$ |
| $s(F_i)$ | Size of the $F_i$ considered (in bytes) |
| P | Incoming packet |
| $s(H_j)$ | Size of the header of $L_j$ |
| $H_j$ | Header of $L_j$ |
| $ovlp(L_j)$ | Number of overlapping rules in leaf $L_j$ |
| $P_i$ | Value of the i-th field of the incoming paquet |
| d | Tree depth, excluding the leaf |
| $Ma_{node}$ | Number of memroy accesses for a node |
| $Ma_{rule}$ | Number of memory accesses for a rule |
| $Ma_j$ | Number of memory accesses for a leaf j, using EffiCuts algorithm |
| $Ma_{j,k}$ | Number of memory accesses for a leaf j and a packet k, using AcceCuts algorithm |
| $C_{j,k}$ | Comparison cost for a a leaf j and a packet k, using AcceCuts algorithm |
| $C_j$ | Comparison cost for a leaf j using EffiCuts algorithm |
| $Mo_j$ | Memory overhead for a leaf j using AcceCuts algorithm |

Equation (1) can be used to detect which of tree depth or leaf traversal requires more memory accesses in tree traversal.

$$nr(L_j) \cdot Ma_{rule} \geq Ma_{node} \cdot d \quad (1)$$

We know that $$Ma_{rule} = \frac{s(R)}{w} = 3 \text{ and } Ma_{node} = 2$$

and we can therefore deduce that tree depth requires a lower number of memory accesses than leaf traversal, as shown in Equation (2).

$$nr(L_j) \cdot 1.5 \geq d \quad (2)$$

FIG. 3 illustrates the maximum depth for every tree generated for each scenario. The maximum tree depth is equal to 4. Nonetheless, the maximum number of rules carried by a leaf is 16. Thus, Equation (1) remains true in the worst case. Furthermore, this equation remains true even in average for every tree generated by the EffiCuts algorithm. Those results are presented in FIG. 4.

As shown in FIG. 4, the minimum average number of rules per leaf is higher than 3.1. Consequently, equation (1) is fulfilled, and leaf traversal requires a higher number of memory accesses compared to node structure traversal. The issue of memory accesses is therefore addressed at the leaf level.

One other issue to address in the SDN context is linked to the explosion of the number of trees generated by EffiCuts. The explosion of the number of trees generated leads to an explosion of leaf traversal time and number of memory accesses. As a consequence, the number of trees generated should be decreased, thus decreasing the total number of memory accesses.

EffiCuts uses separable trees in order to reduce the overlap between large and small rules. For every field of a rule, if the range covered by a field of the rule is larger than 50% of the total range of the considered field, this field is deemed large for this rule. Otherwise, it is small. This process is performed on every field of a rule and on every rule. Then, the rules are binned into different categories based on the combinations of large and small fields. The value of 50% introduced in EffiCuts was set based on prior experimental analysis.

The percentage that defines the difference between large and small rules is named the grouping factor D. As previously stressed, the 12-tuple context creates a very large number of possible combinations. Considering that a tree is created for each combination and that all trees are traversed, this implies that a large number of memory accesses are performed for each rule look-up (even though the trees are small). Thus, in order to find a way to reduce the number of categories, this grouping factor D is made variable, unlike the similar parameter in EffiCuts which was fixed experimentally to 50%. A value of 50% for D sometimes introduces a large number of trees which results in a larger number of memory accesses. This is mainly due to some fields that contain a small number of large rules thus creating a large number of small trees, because for each category of large rules a tree is created. The proposed solution simply consists of adapting D to the data at hand.

The AcceCuts algorithm can analyze the percentage of large rules for every field, starting with a value of 50% for D. If the algorithm detects fields that contain a percentage of rules that is less than or equal to 10% of the total number of rules, for example, it increases the value of D by 10%. This procedure is repeated until those fields contain a percentage of rules close to 0%, thereby eliminating a significant number of trees. Of course a person skilled in the art would understand that D can vary from field to field or vary globally for all the fields at the same time and that the 10% and 0% percentages are given as examples only. The value increase for D can be any percentage value above 0% and the percentage of rule can be anything starting from 0% or more.

Reducing the number of trees improves performance in two ways. Firstly, from a hardware implementation perspective, reducing the number of trees reduces the amount of hardware resources needed to access a data structure, which can also be traversed more efficiently. Secondly, a smaller number of trees decreases the number of memory accesses by eliminating the need to traverse many small trees, and thereby many leaves. This method has been validated in simulation, and works pretty well for rules with wildcards on some fields. Nevertheless, the introduction of the adaptive grouping factor tends to reintroduce overlap between rules, when considering a value for D higher than 50% which tends to increase the size of data sets. Still, the resulting overhead is reasonably small.

A modification of the cutting heuristic is now discussed. EffiCuts generates a large number of nodes (e.g. when compared to HiCuts). In each iteration of the heuristic used by EffiCuts to determine the number of cuts to be performed, a variable Sm (space measurement) is computed using equation (3) as the number of partitions done on the previous iteration, $Np_i$, plus the number of rules of the sibling child nodes under consideration. Those children nodes are virtual until inequality of equation (5) becomes false. Then, the node considered is cut according to number of cuts computed in equation (4) at the last iteration that fulfills equation (5).

$$Sm(i) = NumRules(children_i) + Np_i \quad (3)$$

$$Np_i = 2^i \quad (4)$$

$$Sm(i) \leq Smpf(NumRules) \quad (5)$$

Here Sm is a space measurement which when compared to Smpf(NumRule) allows to detect if more cuts are needed or not, i is the iteration number, NumRules is the number of rules contained in the node under analysis at iteration i, and Smpf a pre-determined space measure function. Experimental results conducted during the development of AcceCuts have provided that Smpf=NumRules·8. This is applied to every node until it contains a number of rules less than or equal to a threshold value that was set to 16, a value commonly used in the literature, during the experimentations. Of course this value can be set to a number different than 16.

Thus, according to Equation (5), Smpf≥17·8=136. The number 17 in this exemplary equation comes from the fact that cuts are made until the number of rules contained in a leaf is greater than 16, i.e. at least 17.

Also, the number of rules within the node being processed decreases as the number of iterations increases and, at the same time, the $Np_i$ term becomes more and more dominant. In simulations, it has been observed that many nodes are cut thousands of times, which creates, in the worst case, as many child nodes.

With each cut, a node or a leaf is created. Thus, this heuristic presents a potential to generate an oversized data structure. The heuristic implemented in HiCuts is based on the following formula:

$$Sm(C(v)) = \sum_{i=1}^{Np(C(v))} NumRules(child_i) + Np(C(v)) \quad (6)$$

Where $Np(C(v))$ represents the number of time the node v is partitioned (i.e. it is also computed according to Equation 4). Here, the heuristic adds the result of all previous iterations along with the number of rules in the temporary nodes used, consequently $S_m$ converges faster to Smpf. Thus, for HiCuts, the number of iterations is reduced, which implies that the number of cuts is also reduced and so is the data set size.

Heuristic of equation 4 and 5 or of equation 6 can be used interchangeably.

The leaf structure modification will now be discussed. By changing the leaf data structure, a new leaf traversal procedure tailored to access only relevant information will also be presented, thereby avoiding many useless memory accesses.

As shown previously, the main issue for leaf traversal resides in the large number of rules held in a leaf where each field of a rule has to be matched against the packet header.

Considering this requirement, when a packet field does not match a sub-rule (a rule constraint on a single field), the entire rule can be discarded. Matching a sub-rule is a necessary but not sufficient condition to match an entire rule. Therefore, partial matching with a rule can be done, for example by doing a match only on a field of this rule, rather than matching a rule entirely. To minimize the number of memory accesses, we maximize the differentiation between rules, by using as few as possible fields to discard rules. If a single field is used for every rule, many partial matches may be positive due to a high probability of rule overlap along a single field, and then the entire rule is fetch. In this case, it is hard to cut down the number of memory accesses. Consequently, multiple sets of sub-rules are created, each one containing sub-rules disjoint two by two, along one field. Rules disjoint two by two do not overlap one other. Therefore, at least one positive match can occur per sub-rule set. For each leaf level, AcceCuts sorts rules, and differentiates them into multiple sub-rule groups. A pre-processing is now done at leaf traversal, as multiple partials match are completed, and then a regular match is performed on a reduced number of rules.

The notation detailed in Table II is used to simplify the comprehension of the leaf structure modifications adopted. Modifying leaf traversal follows modifying the leaf header. The modified header comprises a field specifying header length, and a sub-rule group dedicated header. Each of this sub-rule group can be described by three fields, such as presented in Table III below. The first field, "Field used" indicates the field used for sub-rule matching, the second field, "Number of sub-rules" indicates the number of sub-rules in this group, and then follows bounds of each "sub-rule" contained in the sub-rule group.

TABLE III

Size of the fields used in the leaf header

| Field | Size (byte) |
| --- | --- |
| Field used | 1 |
| Number of rule used | 1 |
| Sub rule | 1-7 bytes |

Table IV below presents the header of a sub-rule group in a leaf. In the example shown in Tables VI and V below, a sub-rule group is associated with rule field number 5, holding three rules, and as introduced previously, each sub-rule bounds are disjoint two by two.

TABLE IV

Header of a sub-rule group in a leaf

| Leaf code | Size of AcceCuts header | AcceCuts header |
| --- | --- | --- |

TABLE V

AcceCuts header

| Field used: i | Number of entries $|S_i1|$ | Sub-rule 1 $F_{i1}$ | Sub-rule 2 $F_{i2}$ | Sub-rule 3 $F_{i3}$ |
| --- | --- | --- | --- | --- |

TABLE VI

AcceCuts header: an example of a set $S_{ij}$ holding 3 sub-rules and where i = 5

| 5 | 3 | [0:12] | [24:68] | [80:125] |
| --- | --- | --- | --- | --- |

The first field used is associated with the dimension or field used for the sub-rule group. In the context presented previously, up to 12 fields can be used to classify packets, and thereby, 4 bits are used to store a value going from 0 to 11. Each sub-rule group can carry at most as many sub-rules as rules held by the leaf. In a preferred embodiment, the maximal number of rule per leaf is limited to 12. Consequently, only 4 bits are used to store the number of sub-rules held by each group. The second field hold the number of entries or sub-rules associated to the same field. Regarding the last field used, it stores lower and upper bounds of each sub-rule and ranges from 1 (small field and mask) to 7 bytes (MAC field and mask value) depending on the field considered.

The pseudo-code of an algorithm used to build a leaf is presented below. As an example, a leaf $L_j$ holds rules presented in FIG. 5A.

1. Copy every rule $R_i$ contained in $L_j$
2. For each field $f$ used, $f \in \{1, d\}$
3.     while (urs ≠ { Ø } ) {

| | |
|---|---|
| 4. | Use $R_1$ as a reference rule |
| 5. | For ($R_i$ in { $L_j$ } \ $R_1$ ) { |
| 6. | If ($F_{fi} \cap F_{f1}$ = { Ø } and ∀ $R_k$ ∈ drs $F_{fi} \cap F_{fk}$ = { Ø }) { |
| 7. | Add $R_i$ to drs |
| | } |
| | } |
| 8. | If( drs ≠ { Ø } ) { |
| 9. | Add $R_1$ to drs |
| 10. | Create the header associated to the group of rules in drs |
| 11. | Remove every rules contained in drs from urs |
| 12. | Flush drs } |
| 13. | If( urs ≠ { Ø }) { |
| 14. | Select a field which has not been chosen yet and with a minimun size |
| 15. | Copy urs in drs |
| 16. | Create the header associated with rules in drs |
| 17. | Flush drs } |

In a first step, the first rule in leaf $L_j$ is selected, $R_l$ and is now used as a reference rule. Then, the algorithm starts to differentiate rules into sub-rules along each field used. AcceCuts first compares along field A, sub-rule $F_{A1}$ with others sub-rules $F_{Al}$, l∈{2, 6}.

The algorithm then selects the first sub-rule $F_{A1}$ not overlapping $F_{Al}$, and the associated rule is then added to Group 1, as illustrated in FIG. 5B. This process is repeated until every sub-rule has been processed.

In a preferred embodiment, another constraint has to be fulfilled: sub-rules have to be disjoint two by two and consequently before adding a sub-rule to Group 1, the pending sub-rule is matched against every rules already held in Group 1. In this case, sub-rules $F_{A2}$, $F_{A4}$ and $F_{A5}$ are added to Group 1 and associated to field A. The processing along field A is now completed. The same process can be repeated along the next field with the remaining rules. This only concerns $R_3$ and $R_6$, which are not already covered in Group 1. Along the B field, all the remaining sub-rules ($R_3$ and $R_6$) are overlapping, and sub-rules cannot be differentiated. The process is now done along field C, and the remaining sub-rules ($R_3$ and $R_6$) can be differentiated along this field. The differentiation process is now completed. The last step is to create the associated header, according to the format presented in FIG. 5B.

The above pseudo-code of AcceCuts algorithm is presented in relation with building a leaf. In this process, two stacks are used, the first one, drs, is used to store the rules associated with a sub-rules group, and the second one, urs, is used to store undifferentiated rules. The pseudocode is given for a leaf $L_j$, where $R_l$ represents the first rule contained in $L_j$.

The pseudo-code of an algorithm used to complete a leaf traversal $L_j$ is presented below. It is assumed that the entire leaf header has been read before starting the process of leaf traversal.

| | |
|---|---|
| 1. | Decode the header |
| 2. | For(∀ $S_{ij}$ in $L_j$ ){ |
| 3. | For(∀ $F_{ip}$ in $S_{ij}$ ){ |
| 4. | If( $P_i$ matches $F_{ip}$ ){ |
| 5. | If( $P_i$ matches $R_p$ ){ |
| 6. | Record the rule priority of $R_p$ |
| 7. | } |
| 8. | } |
| 9. | } |
| 10. | } |

Based on the same example exposed in FIGS. 5A and B, each sub-rule $F_{jl}$ of each sub-rules group is matched against the appropriate packet field. In case of a positive match, then the associated rule is read and matched entirely against the packet fields. Considering the incoming packet presented in FIG. 6, this algorithm selects each sub-rule of every sub-rule group, beginning with Group 1, and matches them against the packet header. If the algorithm finds a $F_{Al}$ so that Pi ⊂ $F_{Al}$, a positive match occurs and a complete match is performed on the rule $R_i$ associated to $F_{Al}$. In the example shown, a sub-rule $F_{Al}$ cannot be found so that $P_i$ ⊂ $F_{Al}$, i.e. no sub-rule contains the value 412 in Group 1. Therefore, the algorithm executes the same processing on the next sub-rule group, that is to say Group 2, and matches sub-rules against packet field C. $P_C$=29 ⊂ [28;31] and thereby a partial positive match occurs with sub-rule $F_{C3}$. Now, a standard match is performed with $R_3$. Nevertheless, the match remains negative and the packet shown in the example matches no rules. The packet classification procedure is now completed, and another incoming packet can be processed.

Figure 7A:
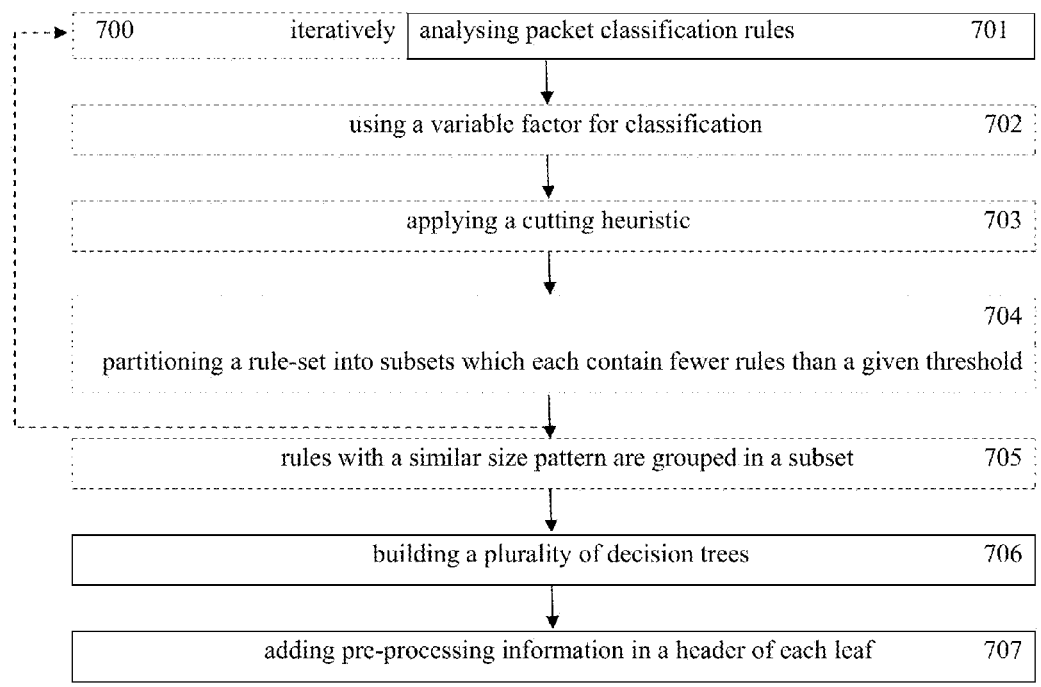
FIG. 7A illustrates steps of a method for packet classification according to an exemplary embodiment.

FIG. 7A illustrates in the form of a flowchart the method for packet classification. The method comprises a step of analysing packet classification rules, step 701, to obtain a plurality of categories of rules. The method further comprises building a plurality of decision trees, step 706, one for each category of rules. The method also comprises adding pre-processing information in a header of each leaf, step 707, of the plurality of decision trees for use in relation with at least one field of a header of a packet, for selecting at least one rule for classification of the packet.

In the method, the pre-processing information can comprise at least one sub-rule for matching against a selected field of the header of the packet. The pre-processing information can also comprise a plurality of sub-rules, disjointed two by two, for matching against the selected field of the header of the packet. The sub-rules can be applied for matching a plurality of selected fields of the header of the packet before making a full match of the header of the packet against at least one complete rule selected for classification of the packet. One complete rule can be selected according to at least one positive match between at least one sub-rule, corresponding to the complete rule, and at least one selected field of the header of the packet.

In the method, the packet classification rules can be analyzed iteratively, step 700, using a variable factor, to obtain the plurality of categories of rules. Iteratively analysing, steps 700, 701, can comprise partitioning a rule-set into subsets which each contain fewer rules than a given threshold, step 704. The partitioning can be done by applying a cutting heuristic, step 703. The rules with a similar size pattern can be grouped in a subset, step 705, and the subset can be associated with a dedicated decision tree. The variable factor can be a ratio of a range covered by a rule over a range covered by a field. The ratio can be varied at each iteration until a smaller number of subsets are obtained.

Figure 7B:
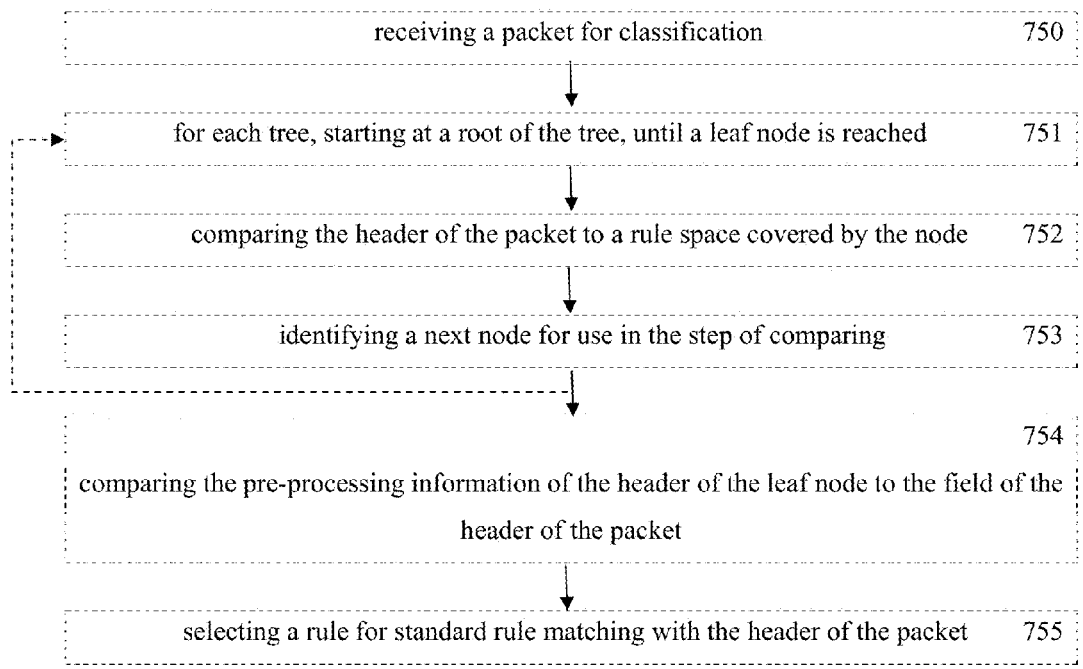
FIG. 7B illustrates steps of a method for tree traversal according to an exemplary embodiment.

FIG. 7B illustrates a method for tree traversal of the plurality of decision trees built previously. The method comprises a step of receiving a packet for classification, step 750. For each tree, the method comprises starting at a root of the tree, until a leaf node is reached, step 751, and iteratively: comparing the header of the packet to a rule space covered by the node, step 752, and identifying a next node for use in the step of comparing, step 753. The method also comprises comparing the pre-processing information comprised in the header of the leaf node to the at least one field of the header of the packet, step 754. The method further comprises selecting at least one rule for standard rule matching with the header of the packet, step 755, for classification of the packet.

The modification of the leaf data structure has been proposed to reduce the number of useless memory accesses. Nevertheless, a preprocessing is now executed prior to rule matching. The overhead introduced by this new leaf data structure will be analyzed, regarding three criteria: number of memory accesses, memory utilization, and comparison cost.

Let's begin with the memory accesses. Before matching sub-rules and rules, the entire header of the leaf is fetched from memory, generating few memory accesses. The equations presented below are made for a leaf $L_j$ and a packet k, with a number of positive match of sub-rule equal to $pm_k$. However, the header $H_j$ holds $|S \cdot j|$ (cardinality) sub-rule groups, including bounds $F_i$ used in each sub-rule group. The following equations apply to AcceCuts.

$$Ma_{j,k} = \frac{H_j + pm_k \cdot s(R)}{w} \quad (7)$$

$$s(H_j) = |S \cdot j| + \sum_{S_{i,j} \in L_j} s(F_i) \quad (8)$$

The first step to evaluate the overhead introduced by AcceCuts is to identify the worst and best case scenario. As described previously, a packet can match at least as many rules as held in the leaf. However, the worst case is represented by a situation where every rule in the leaf generates a positive match, so that rules are not disjoint two by two, or, said differently, differentiated. In this case a single sub-rule group is considered; it is the worst case. However, in order to differentiate rules, a sub-rule group should carry at least 2 rules. A leaf can be defined in such a way that each sub-rule groups contains 2 rules, with an odd total number of rules, and thereby the last sub-rule group holds only one sub-rule. Therefore, the highest number of sub-rule group reachable is $L_j/2+1$. Regarding the size required to store upper and lower bounds, the same assumptions as presented previously are made, that is to say ranging from 1 to 7 bytes.

$$nr(L_j) \geq pm_k \geq 0 \quad (9)$$

$$\begin{cases} \frac{L_j}{2} + 1 \geq |(S \cdot j)| \geq 1 \\ 7 \geq s(F_i) \geq 1 \end{cases}$$

In comparison, the EffiCuts algorithm is much simpler as every rule held in the leaf has to be read. From this statement derives Equation (10).

$$Ma_j = \frac{nr(L_j) \cdot s(R)}{w} \quad (10)$$

The performance in the worst and best cases is now evaluated. The worst case occurs when each sub-rule held in the leaf header generates a positive match, and forces to read every rule. Each sub-rule group $S_{ij}$ carries sub-rules disjoint two by two, except for the last sub-rule group, holding undifferentiated rules. Therefore, every sub-rules held in a leaf generate a positive match if and only if they are not differentiated two by two in the same sub-rule group. This case appears either when only one sub-rule is held in $S_{ij}$, or when the last sub-rule handles all undifferentiated sub-rules. However, for the worst case scenario $pm_k = nr(L_j)$, and $|S \cdot j|=1$.

Moreover, independently of the considered scenario, s(R)=41 bytes and upper bound of $s(F_i)$ equals 7, based on inequality (9).

Based on those assumptions the equations (11), (12) and (13) are derived for the worst case.

$$s(H_j) = 1 + 7 \cdot nr(L_j) \quad (11)$$

$$1 + 7 \cdot nr(L_j) << 41 \cdot nr(L_j) \quad (12)$$

$$1 + \min(s(F_i)) \cdot nr(L_j) + s(R) \approx \min(s(F_i)) \cdot nr(L_j) + s(R) \quad (13)$$

For the best case, an assumption is made that $p_{mk}=1$ and $|S \cdot j|=1$; which means that only one positive match occurs with a sub-rule, leading to reading and matching only one rule. Therefore, in the best case, only one positive partial match occurs; this scenario occurs when only one sub-rules group $S_{ij}$, holding differentiated rules, exists. Table VII presents a partial conclusion of the different scenarios studied.

TABLE VII

| | Worst case and Best Case performance comparison btw AcceCuts and EffiCuts | |
|---|---|---|
| | EffiCuts | AcceCuts |
| Worst case | $O\left(\frac{nr(L_j) \cdot s(R)}{w}\right)$ | $O\left(\frac{nr(L_j) \cdot s(R)}{w}\right)$ |
| Best Case | $O\left(\frac{nr(L_j) \cdot s(R)}{w}\right)$ | $O\left(\frac{\min s(F_i) \cdot nr(L_j) + s(R)}{w}\right)$ |

Through the theoretical analysis made, the performance met by AcceCuts in the worst case is in the same order of magnitude as EffiCuts. Even though AcceCuts offers similar performance as EffiCuts in the worst case, in the best case, AcceCuts is a way ahead.

Let's now take a look at the Comparison Cost of AcceCuts. The leaf traversal processing involves a tentative match of every sub-rule $F_{il}$ held in each sub-rules group $S_{ij}$ against selected fields of the packet header. Then, for every positive partial match, a complete match is done along each field used in the rule. This process requires many match from a comparison point of view. In this section, we complete a comparison cost evaluation introduced by the new leaf data structure. When reaching a leaf, a comparison against each header entry is performed, and then as many comparisons as the number of positive matches, on each dimension, are made, as illustrated by Equation (14).

$$C_{j,k} = c \cdot (nr(L_j) + pm_k \cdot d) \quad (14)$$

Regarding the EffiCuts algorithm, no matters the scenario considered, each field of each rule must be match against packet header. For this section, c is introduced. c represents the cost of sub-rule comparison, independently of the field considered. Therefore, the matching process of a single rule costs c multiplied by the number of fields considered, as shown in Equation (15).

$$C_j = c \cdot nr(L_j) \cdot d \quad (15)$$

The assumption regarding the worst and best cases remains identical as the one presented above. Therefore, a recapitulative chart is shown in Table VIII below.

TABLE VIII

Worst case and Best Case complexity comparison between AcceCuts and EffiCuts

|  | EffiCuts | AcceCuts |
|---|---|---|
| Worst case | $O\,(nr(L_j) \cdot d \cdot c)$ | $O(nr(L_j) \cdot d \cdot c)$ |
| Best Case | $O\,(nr(L_j) \cdot d \cdot c)$ | $O\,((nr(L_j) + d) \cdot c)$ |

For memory performance, comparison cost for AcceCuts remains close to EffiCuts in the worst case. EffiCuts is insensitive to the considered scenario, the only parameter which impacts on EffiCuts performance is the number of rules held in the leaf. AcceCuts has been designed to minimize as much as possible the influence of leaf size. Therefore, in average, AcceCuts cuts down drastically the number of comparisons to classify a packet. Whereas EffiCuts completes a linear matching process on every rule in the leaf, AcceCuts only completes a pre-processing on few sub-rules and then preferably matches completely one rule. In some instances, none or many complete rules may be matched. Nevertheless, in the best case, EffiCuts needs to match a single rule, and thereby requires fewer comparisons over AcceCuts. Indeed, when considering a leaf with a single rule, the pre-processing introduced by AcceCuts requires some extra comparisons. For other situations as shown in Table VIII, AcceCuts reduces the number of comparisons over EffiCuts in the best case.

Regarding the memory overhead, as exposed above, the header modification introduced by AcceCuts increases the quantity of information stored in the header of a leaf, compared to EffiCuts leafs header. A theoretical study of the memory overhead is now made, and aims mainly at defining an upper and lower bound reached. The first step is to identify a best case and worst case scenarios, each respectively generating the lowest and highest overheads, or extra memory consumption.

The focus is on the modified header introduced in AcceCuts. Only the size of the extra information is evaluated; the number of rules held in the leaf is not the main concern. The scenario minimizing or maximizing Equation (8) defined above, is therefore identified, where $s(H_j)$ depends mainly on the size of the field considered, as the field specifying which field of the packet is used and the field holding the number of entries in the sub-rule group are size constrained. The field size impacts directly on the memory size required to store the sub-rule bounds, as the size ranges from 1 to 7 bytes, as exposed in Table III presented previously.

Regarding the best case, the scenario is associated to identifying a scenario which fulfil $\min(H_j)$). This condition is met when considering a leaf with a single rule. When the AcceCuts algorithm builds the associated sub-rule group, since only a single rule is processed, the algorithm uses the first field to build the relevant header.

Consequently in this case, it is not guaranteed that AcceCuts selects $\min_i(s(F_i))$; it depends on the implementation used. AcceCuts may use many different methods to build the associated sub-rule groups. For instance, many methods may be used to determine with which field to start building the associated sub-rule groups. The algorithm can start with smaller fields and proceed in ascending order to finish with larger fields. The algorithm can start with fields allowing for a better differentiation, such as, for example, fields containing IP addresses of the source and the destination of the packet. The algorithm can use a heuristics to classify the fields in an optimal order with a preference for smaller fields first. It is easy to modify the pseudo code shown above for building a leaf, so that the field with the smallest size is stored. In this case, the overhead can be evaluated with Equation (16).

$$Mo_j = 1 + \min_i s(F_i) \qquad (16)$$

In the best case, with the hypothesis made above, the overhead is limited to 2 bytes.

It is more difficult to identify the worst case scenario, as multiple combinations can lead to a bad situation with much information to store. For instance, what is the worst situation between multiple sub-rule groups each holding few sub-rule, or a few number of sub-rule group with many sub-rules? Even though finding the worst scenario seems difficult, the last field, used to store bounds of each sub-rule is the most memory consuming, as the size ranges from 1 to 7 bytes, compared to less than one byte for the two others fields. However, a MAC field and prefix consumes 7 bytes whereas the next biggest field, IP address, uses only 5 bytes. Other fields are relatively small compared to those two fields and therefore are far away from the worst case scenario. The worst case scenario is therefore reached when considering a leaf with only one single sub-rule group, holding differentiated rules associated to MAC field. One might think that the worst case is achieved for a single sub-rule group with undifferentiated sub-rules. But in this case, as shown in the algorithm, the field chosen is selected to minimize the data size store. In such a case, the MAC field will not be chosen. Equation (17) gives the memory overhead for a leaf j using AcceCuts algorithm.

$$Mo_j = 1 + \max_i s(F_i) \cdot nr(L_j) \qquad (17)$$

In the worst case, the memory overhead can be as high as 85 bytes; that is to say close to 2 rules over 12 fields.

EffiCuts algorithm does not store extra information, in addition to the rule, and a leaf descriptor. So, AcceCuts introduces a real overhead in terms of memory storage over EffiCuts leaf organization. Nevertheless, heuristic modifications have been performed in AcceCuts, and tackle the memory overhead introduced by leaf modification.

The performance offered by AcceCuts has been evaluated and measured as an improvement over EffiCuts. In order to do this, multiple parameters were measured: memory consumption, number of memory accesses and number of comparisons. AcceCuts is an algorithm with a variable performance, dependent on incoming packets. Thereby, to obtain reliable results, the parameters were only measured for the worst and best case. Thereby, the performance reached by AcceCuts could be bound.

The version of EffiCuts used as reference is the original code created by EffiCuts authors. The parameters used for evaluating performance are summarized in Table IX.

TABLE IX

Parameters used for simulations

| Value of parameter | AcceCuts | EffiCuts |
|---|---|---|
| Size of leaf | 12 | 12 |
| Binning Factor D | Adaptive Grouping factor | 0.5 |
| Binning Factor D for IP field | 0.05 | 0.05 |
| Space Factor | 8 | 8 |
| Maximum number of intervals | 7 | 7 |

Regarding leaf size, it was discovered that AcceCuts reaches optimal performance when considering a different leaf size compared to what is used in EffiCuts. Nevertheless, in order to present accurate results, simulations were run for AcceCuts and EffiCuts with the same leaf size. Table generators were used for making classification tables for the 12-tuple context. Bus width w were set to 18 bytes, so that each node requires two memory accesses.

As mentioned previously, the measurement process is focused on two scenarios: worst case and best case. Regarding EffiCuts, it is pretty simple to define the best case and worst case. For the worst case, the deepest leaf which holds as much rules as the worst case is picked, for each generate tree. And for the best case the deepest leaf which holds the fewer rules is picked, for each generated tree. A metric is used in order to identify the best case and worst case of the AcceCuts algorithm. For each leaf created, a parameter called score, S, is computed. The minimum value represents the best case, and the maximum value represents the worst case. For both min and max value, only the deepest leaves of the tree were considered.

The score, S, was computed using the following equations.

$$\begin{cases} S_{max} = \frac{s(H_j)}{w} + \frac{s(R)}{w} \cdot ((ovlp(L_j) - 1) + |S \cdot j|) \\ S_{min} = \frac{s(H_j) + s(R)}{w} \end{cases} \quad (18)$$

Equation (18) aims at computing the number of memory accesses needed to complete a leaf traversal, without considering the tree traversal. In AcceCuts, the first step to complete leaf traversal is to read leaf header and then match every sub-rule of each sub-rules group against the packet header. If multiple sub-rule groups co-exist, each sub-rule group holds sub-rules disjoint two by two except the last group. The last sub-rule group of a leaf can either hold sub-rules non disjoint or disjoint two by two. However, if a packet header matches one sub-rule of a group, it does not stop the process of sub-rule matching. This process is stopped only when each sub-rule of each group has been compared. Thereby, positive matches can occur as much as the number of sub-rules group holding sub-rules disjoint two by two. Otherwise, positive matches equal the number of sub-rules hold in a group.

In order to evaluate AcceCuts and EffiCuts scalabilty, the data structure size generated was measured. However, leaf structure modification introduced in AcceCuts generates memory overhead, as a leaf now holds at the same time a larger header, for a preprocessing and rules. Therefore, the extra memory used to store the new header was also evaluated. For this aim, EffiCuts, AcceCuts with EffiCuts leaf structure and finally AcceCuts were compared. The AcceCuts algorithm with EffiCuts leaf structure is also called "AcceCuts without leaf processing".

Another parameter is linked to the number of comparisons needed to classify a packet. Therefore, the number of comparisons was evaluated in the best and worst case. AcceCuts without leaf structure modification shares the same leaf structure with EffiCuts, and so is the order of complexity of comparison. That is why only AcceCuts and EffiCuts were taken into account in this evaluation.

As it will be shown below, the performance reached by AcceCuts reflects mainly the differentiability of rules into sub-rule groups holding only sub-rules disjoint two by two. Therefore, to better understand memory accesses results, the maximum number of sub-rule group generated or the maximum number of undifferentiated sub-rules were evaluated. Indeed, memory access measurement is based on the worst case scenario, and is impacted by these two parameters.

Figure 8:
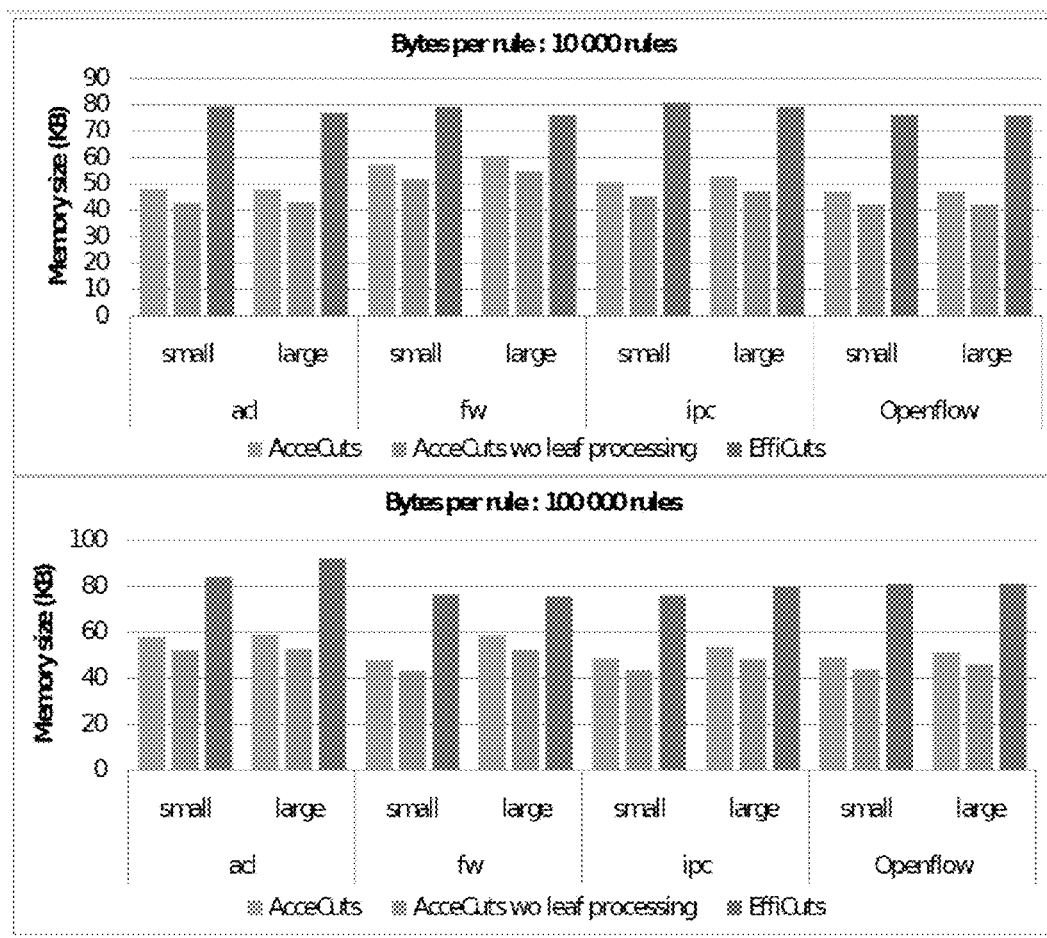
FIG. 8 illustrates the number of bytes per rule obtained through experimental results according to an exemplary embodiment.

The experimental results are now presented. For the first part, the size of the data structure generated, divided by the number of rules used was evaluated. In order to do so the number of byte per rule used for the data structure was evaluated. In FIG. 8, we observe that the byte per rule value for EffiCuts algorithm is close to 80 bytes, independently of the scenario considered IPC, ACL, FW, for classification table with less than 10 000 entries. However, AcceCuts without leaf structure modification generated a data structure so that byte per rule value was bounded between 42 and 53 bytes. Taking a closer look at the overhead introduced by changing the leaf structure, memory consumption was increased by 15% over AcceCuts without leaf structure modification. Even though extra memory consumption was added, AcceCuts still cuts down the memory utilization by 33% over EffiCuts.

When considering 100 000 rules, a wider range of fluctuation was observed for the EffiCuts algorithm, ranging from 70 to 90 bytes. Here again, AcceCuts generated a data structure smaller by 33% over EffiCuts, even with the new leaf structure. However, the overhead in this case, when opposing AcceCuts with and without leaf modification, was relatively limited and was below 14%.

Figure 9:
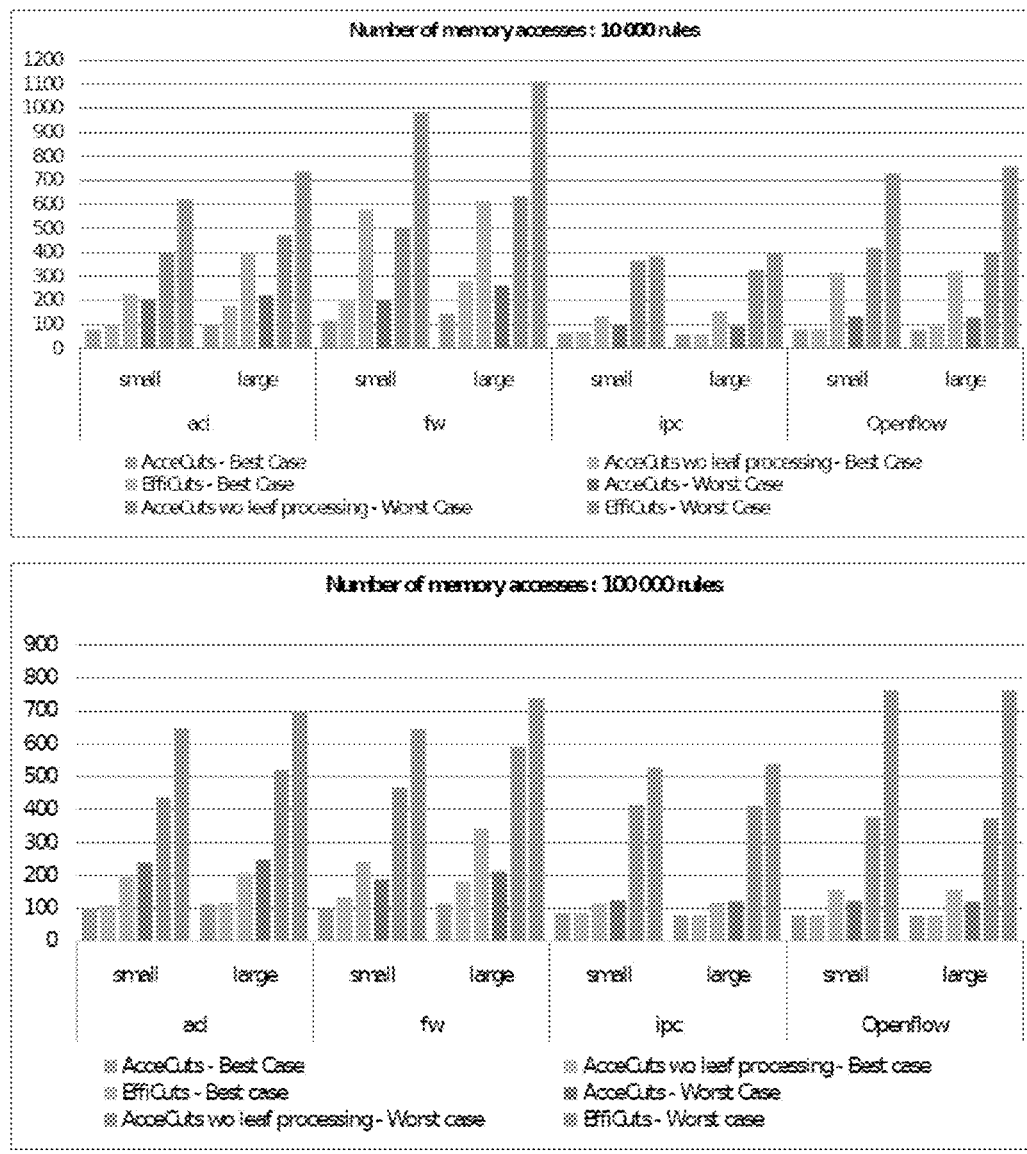
FIG. 9 illustrates the number of memory accesses, obtained through experimental results, according to an exemplary embodiment.

FIG. 9 illustrates the number of memory accesses. On the one hand there is the AcceCuts algorithm, with and without leaf structure modifications, and on the other hand there is the EffiCuts algorithm. Firstly, small classification tables, with 10 000 rules, were analyzed.

The effectiveness of leaf modification was observe; AcceCuts with leaf structure modification cuts down the number of memory accesses over AcceCuts without leaf structure modification by 65% in the worst case scenario, and by 35% in the best case scenario considered. However, even without leaf modification, AcceCuts incurred less memory accesses than EffiCuts, by a factor of 2 in the best case, but also in the worst case. In average, AcceCuts decreased the number of memory accesses by a factor of 3.9 in the worst case considered, and by 3.7 in the best case, over EffiCuts.

Moreover, AcceCuts is less sensitive to table types compared to EffiCuts, as the variation range for AcceCuts is much more limited compared to EffiCuts. AcceCuts allows classifying a packet in the worst case in up to 252 memory access for every context presented here, independently of the number of rules taken into account. The AcceCuts algorithm performed better with IPC classification tables, and minimized the difference between the worst case and best case. The high performance reached here will be explained later, with the number of sub-rule groups and maximum number of undifferentiated sub-rules.

When considering larger classification tables, with 100 000 entries, the same observations were made as previously with smaller classification table. Therefore, AcceCuts improves performances over EffiCuts, even without leaf structure modification, in both the worst case and best case. In average, the reduction factor is close to 3.2 for the worst case, and in the best case a factor of 2.3 is reached. However, AcceCuts performs more efficiently when dealing with IPC classification tables. Here again, the total number of memory accesses remains below 250.

Therefore we can conclude that, regarding the number of memory accesses, AcceCuts performs better over EffiCuts in both cases of small and large scenarios. Nevertheless, the best improvement is made for the worst case, with a reduction over 3 times. Improving the worst case was a concern regarding memory accesses and AcceCuts fulfills this requirement for hardware implementation. Even though emphasis was put on the worst case, AcceCuts still used half of the number of memory accesses required by EffiCuts.

Furthermore, AcceCuts, even with leaf structure modification, introduces less than or as much comparisons as needed in EffiCuts to complete a leaf traversal. Independently of the number of rules considered, the leaf structure introduced in the AcceCuts algorithm does not create an explosion of comparisons, for both best case and worst case. Moreover, the number of comparisons for AcceCuts in the worst case remained stable to 148. This situation is mainly due to the number of rules held in a leaf for the worst case. In fact, the worst case represented 16 rules, and thereby generated a number of comparisons equals to the number of rules multiplied by the number of fields for EffiCuts.

When considering classification table with 10 000 entries, such as exposed in FIG. 9, it was observed, in the best case, that EffiCuts required one comparison less over AcceCuts. However, those results, in the best case and worst case, reflect the analysis done previously. Even if the number of comparisons for AcceCuts is greater than for EffiCuts in the best case, we observed the opposite situation for the worst case, as AcceCuts generated only half of the comparisons needed in EffiCuts. AcceCuts clearly out-performed EffiCuts, and reached the best results for IPC and OpenFlow scenarios. When AcceCuts handled 100 000 rules, the same conclusions could be drawn as with the 10 000 rules.

In the best case, AcceCuts remains behind EffiCuts, by only one comparison, due to the overhead introduced by AcceCuts when considering only one rule in a leaf. In the worst case, AcceCuts cuts down in average the number of comparisons required. These observations support the conclusions hypothesised.

The different simulations exposed before are not self-consistent, and in order to better understand them, multiple parameters introduced in AcceCuts can be considered. As mentioned above, the number of memory accesses and also of comparisons is directly linked to the number of sub-rule group and undifferentiated rules. Every sub-rule of each sub-rule group has to be traversed and can lead to up to one match per sub-rule group, or more, when dealing with undifferentiated sub-rule group. In our simulations, the assumption that each sub-rule in an undifferentiated sub-rule group generates a positive match was made. Therefore, the maximal numbers of undifferentiated sub-rules as well as the maximum number of sub-rule groups are important parameters to measure to evaluate the performance of AcceCuts.

Figure 10:
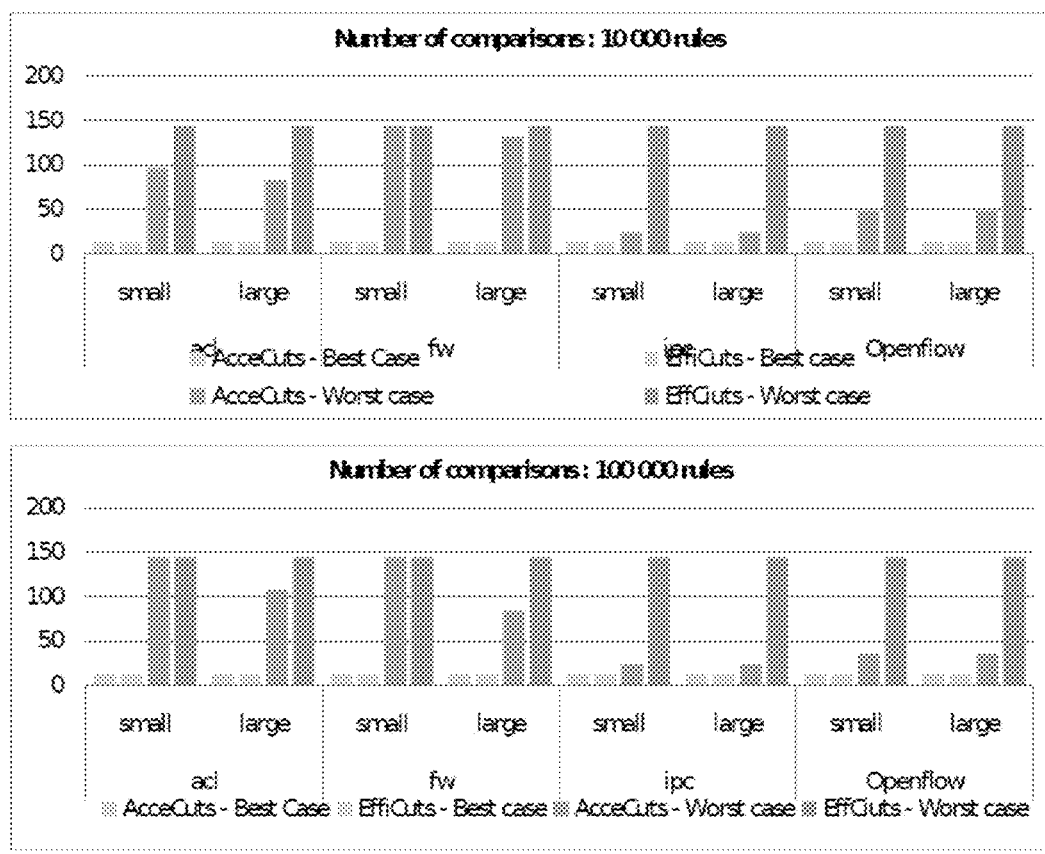
FIG. 10 illustrates the number of comparisons needed, obtained through experimental results, according to an exemplary embodiment.

Both graphics presented in FIG. 10 are associated to different scenarios. For instance, the situation when reaching the maximal number of undifferentiated sub-rules per group is not necessarily the same as the one when reaching the maximal number of sub-rule group. Even though the situations associated are different, emphasis is put on identifying the worst case scenarios.

Figure 11:
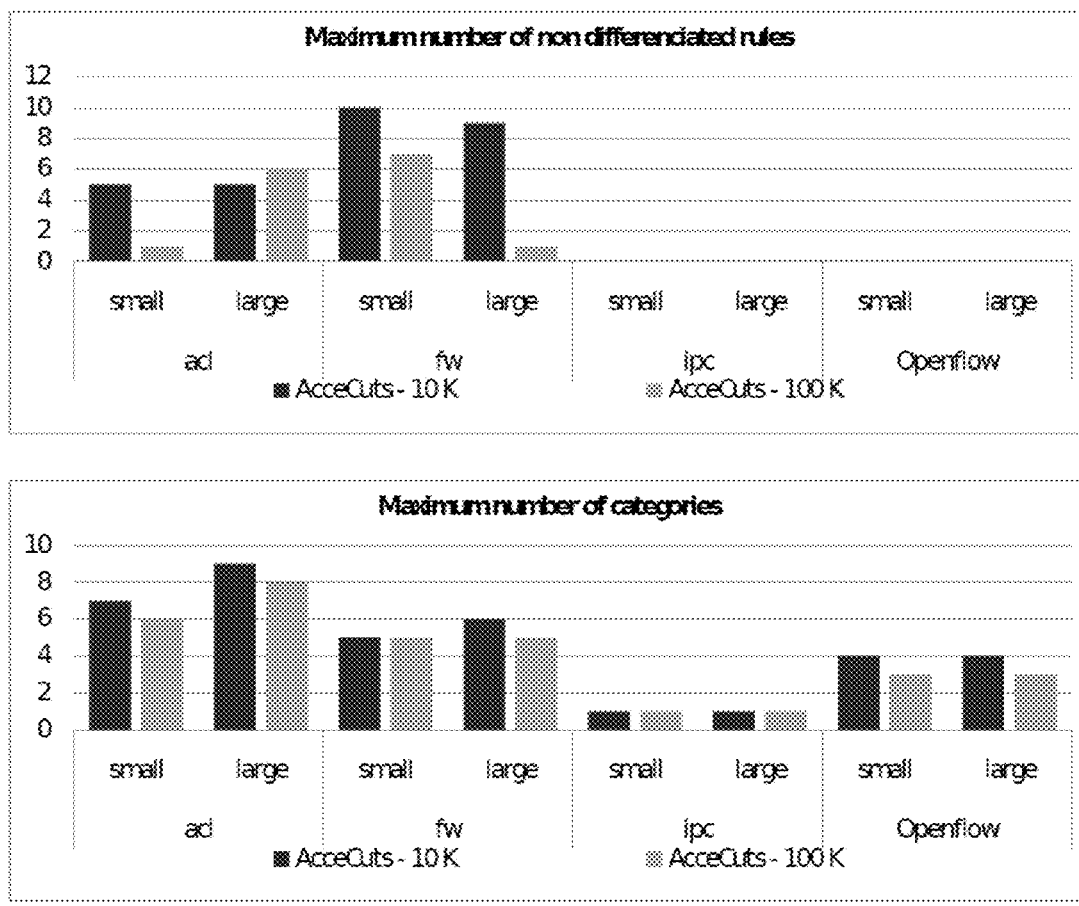
FIG. 11 illustrates measurement of AcceCuts parameters, obtained through experimental results, according to an exemplary embodiment.

In FIG. 11, the maximum number of undifferentiated sub-rules is less than the size of a leaf. So far, for every scenario tested, the maximal number of undifferentiated sub-rules was 10 when supporting FW based classification tables with 100 000 entries. However, the number of undifferentiated sub-rules decreases when dealing with large tables (100 000 rules) compared to smaller tables (10 000 rules).

Even if the AcceCuts algorithm has been optimized for SDN context, with a large number of fields, it is interesting to evaluate the performance for the 5-tuple context. In this case, we make the assumption that a rule size is 19 bytes is made, the bus width remains unchanged and classification tables are generated using the same methodology as exposed before.

Figure 12:
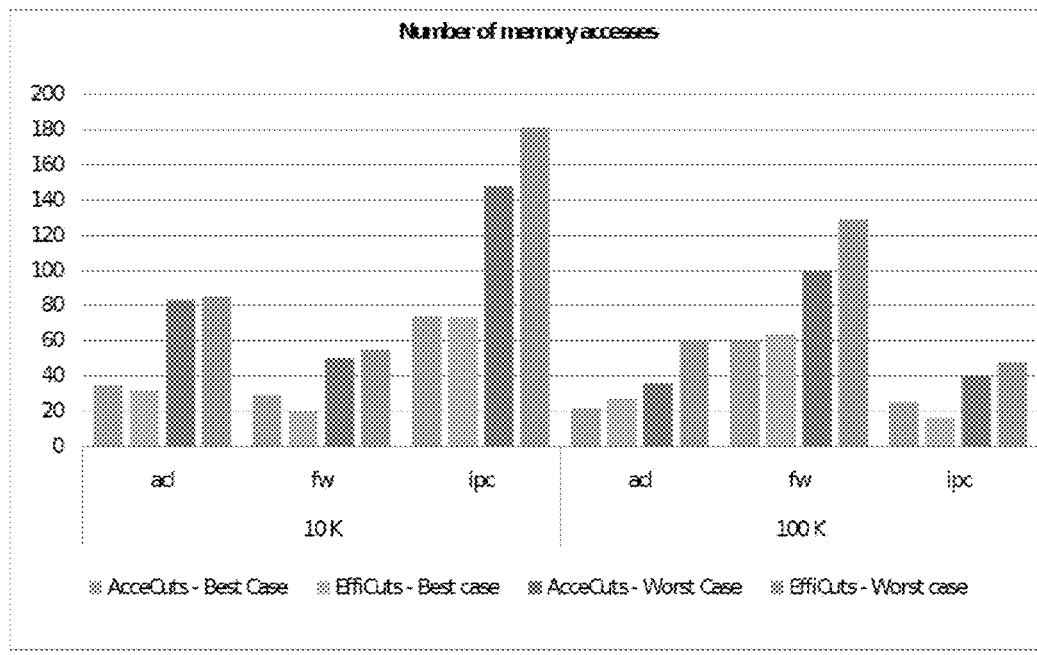
FIG. 12 illustrates the number of memory accesses on five fields, obtained through experimental results, according to an exemplary embodiment.

In the simulation presented in FIG. 12, regardless of the scenario and number of rules considered, the number of memory access reached by AcceCuts in the worst case is lightly better than with EffiCuts. On average, AcceCuts down the number of memory accesses over EffiCuts by 18%. Conversely, AcceCuts generate a hike of 5% in the best case over EffiCuts.

Figure 13:
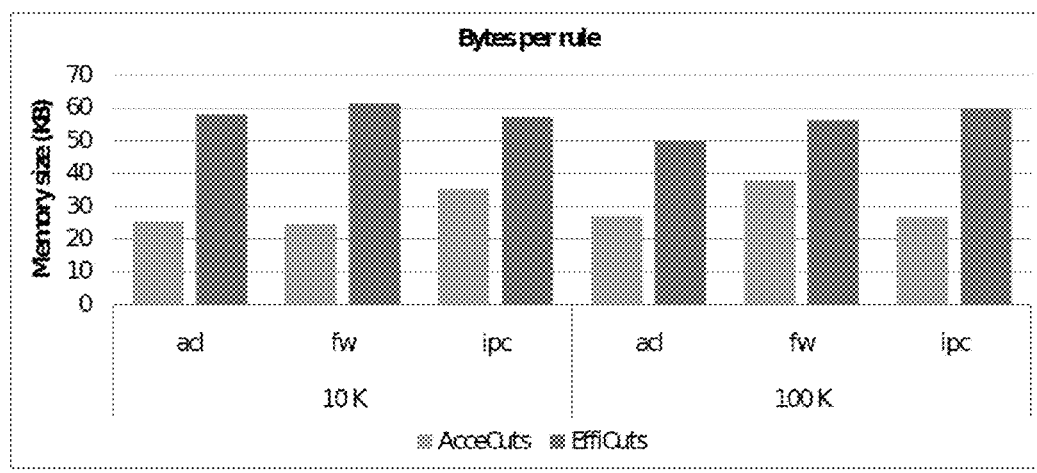
FIG. 13 illustrates the memory breakdown on five fields, obtained through experimental results, according to an exemplary embodiment.

Regarding the size of the data structure generated per rule, as illustrated in FIG. 13, AcceCuts cuts down this parameter for every scenario simulated, on average by 48% over EffiCuts. This improvement is mainly due to the new heuristic employed by AcceCuts. As exposed before, at the same time, this heuristic incurs deepest trees, and tends to increase the number of memory accesses. Still, leaf structure modification allows reducing the number of memory accesses by over 25% by comparison with a regular leaf structure.

AcceCuts is therefore an algorithm able to handle complex rules, for the SDN context while remaining implementable in hardware. EffiCuts such as other Decision Tree Based algorithms have been implemented in hardware. To reach the highest performance, those implementations dedicate one engine per tree. In order to validate how easily AcceCuts can be implemented, we observe the number of memory accesses per tree in the SDN context in FIG. 14, and compare it to the 5-tuple context in FIG. 15, for which hardware implementation have been made. In both FIGS. 14 and 15 we observe that the order of magnitude is equal for both contexts. Therefore, we can conclude that AcceCuts can achieve high performance in hardware, as on one hand, the number of memory accesses per tree is in the same order of magnitude for both SDN context and 5-tuple context, and on the other hand, AcceCuts does not face any issue related to an explosion of number of comparisons when matching rules or any others issues observed in the result section.

AcceCuts is therefore designed to reach a higher degree of performance over EffiCuts, and to cut down the number of memory accesses and data structure size. First, by adopting an adaptive grouping factor, a method which parses the rule set properties and bins rules accordingly, in an optimized manner. Secondly, by adopting a heuristic generating a small sized data structure without impacting on the data structure depth. Finally, by adopting a leaf processing modification, in order to cut down the number of memory accesses over EffiCuts. These extensions provide gains in many contexts but they were tailored for the OpenFlow-like rule context.

AcceCuts gives the highest degree of performance compared to EffiCuts when the size of the rule becomes larger than a node size. It is shown using suitable benchmarks that they allow reducing the number of memory accesses by a factor of 3 on average, while decreasing the size of the data structure by about 45%. AcceCuts is an algorithm that cuts down two opposite parameters at the same time while remaining versatile. These three aspects allow AcceCuts to be used with larger classification tables over a larger number of fields without excessive performance degradation. The performance reached allows AcceCuts to be used with larger classification tables over a larger number of fields without excessive performance degradation, and is promising for the design of a high-speed hardware classification unit. In conclusion, the AcceCuts algorithm could be widely use in future networking equipment.

Figure 16:
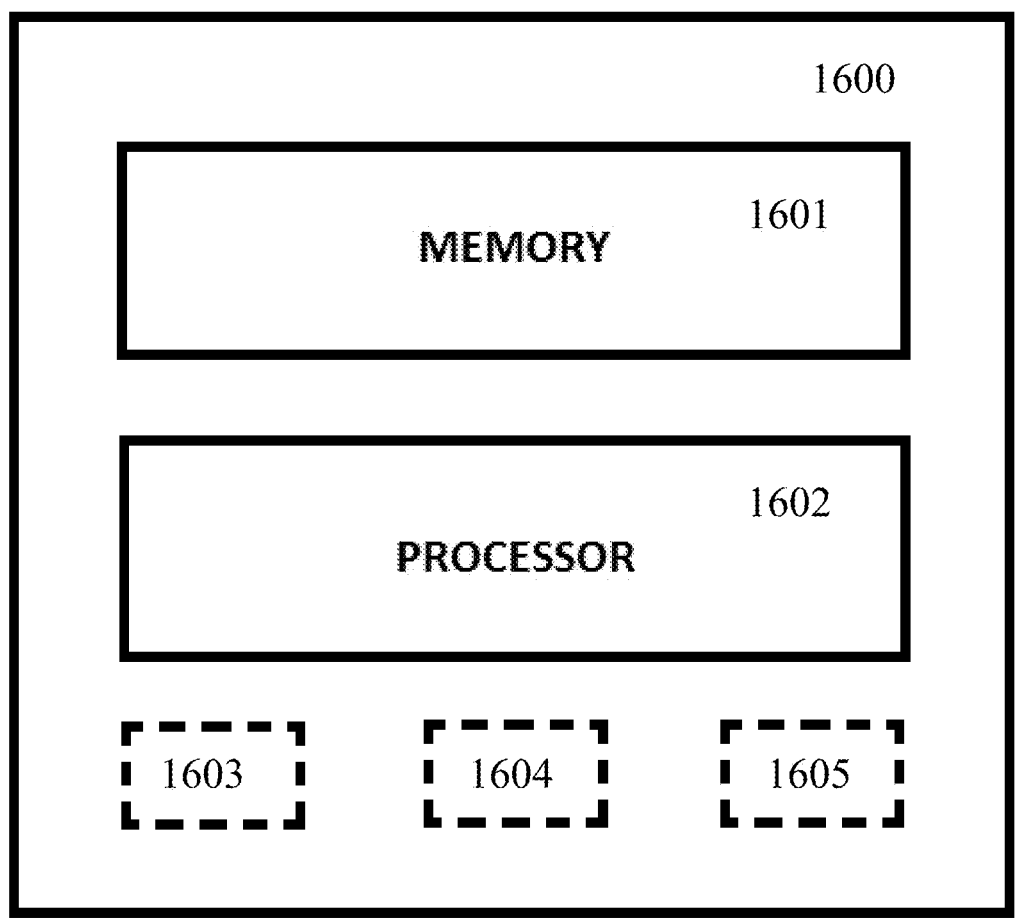
FIG. 16 is a schematic illustration of a computing device according to an embodiment of the invention.

FIG. 16 is a block diagram of a computing device 1600 suitable for implementing aspects of the embodiments disclosed herein. As discussed above, in the context of packet classification, the computing device 1600 comprises a memory 1601 and a processor 1602. The computing device 1600 may include a communications interface 1603. The communications interface 1603 generally includes analog and/or digital components for sending and receiving communications to and from other computing device 1600, servers or nodes, either directly or via a network. Those skilled in the art will appreciate that the block diagram of the computing device 1600 necessarily omits numerous features that are not necessary for a complete understanding of this disclosure.

The computing device 1600 for packet classification comprises a processor 1602 and memory 1601. The memory 1601 contains instructions executable by the processor 1602 whereby the computing device 1600 is operative to analyze packet classification rules to obtain a plurality of categories of rules. The computing device 1600 is further operative to build a plurality of decision trees, one for each category of rules. The computing device 1600 is also operative to add pre-processing information in a header of each leaf of the plurality of decision trees for use in relation with at least one field of a header of a packet, to select at least one rule for classification of the packet.

The pre-processing information can comprise at least one sub-rule for matching against a selected field of the header of the packet. The pre-processing information can also comprise a plurality of sub-rules, disjointed two by two, for matching against the selected field of the header of the packet. The sub-rules can be applied for matching a plurality of selected fields of the header of the packet before making a full match of the header of the packet against at least one complete rule selected for classification of the packet. The rule can be selected according to at least one positive match between at least one sub-rule, corresponding to the complete rule, and at least one selected field of the header of the packet.

The step of analysing can comprise iteratively analysing the packet classification rules using a variable factor, to obtain the plurality of categories of rules. The step of iteratively analysing can comprise partitioning a rule-set into subsets which each contain fewer rules than a given threshold. The partitioning can be done by applying a cutting heuristic. The rules with a similar size pattern can be grouped in a subset and the subset can be associated with a dedicated decision tree. The variable factor can be a ratio of a range covered by a rule over a range covered by a field. The ratio can be varied at each iteration until a smaller number of subsets are obtained.

The memory 1601 of the computing device 1600 can contains further instructions executable by the processor 1602 to receive a packet for classification. For each tree, starting at a root of the tree, until a leaf node is reached, the computing device 1600 can iteratively: compare the header of the packet to a rule space covered by the node and identify a next node for use in the step of comparing. The computing device 1600 can compare the pre-processing information comprised in the header of the leaf node to the at least one field of the header of the packet. The computing device 1600 can select at least one rule for standard rule matching with the header of the packet, for classification of the packet.

Although all of the details of the computing device 1600 are not illustrated, the computing device 1600 comprises one or several general-purpose or special-purpose processors 1602, co-processor engine or other microcontrollers programmed with suitable software programming instructions and/or firmware to carry out some or all of the functionality of the computing device 1600 described herein. In addition, or alternatively, the computing device 1600 may comprise various digital hardware blocks (e.g., one or more Application Specific Integrated Circuits (ASICs), one or more off-the-shelf digital or analog hardware components, or a combination thereof) 1604-1605 configured to carry out some or all of the functionality of the computing device 1600 described herein. A memory 1601, such as a random access memory (RAM), may be used by the processor 1602 to store data, such as the decision trees, and programming instructions which, when executed by the processor 1602, implement all or part of the functionality described herein. The computing device 1600 may also include one or more storage media (not illustrated) for storing data necessary and/or suitable for implementing the functionality described herein, as well as for storing the programming instructions which, when executed on the processor 1602, implement all or part of the functionality described herein. One embodiment of the present disclosure may be implemented as a computer program product that is stored on a computer-readable storage medium, the computer program product including programming instructions that are configured to cause the processor 1602 to carry out the steps described herein.

According to an embodiment, a computing device for packet classification is provided. The computing device interacts with a server, and comprises an analyzing module for analyzing packet classification rules to obtain a plurality of categories of rules The computing device also comprise a building module for building a plurality of decision trees, one for each category of rules The computing device also comprises an adding module for adding pre-processing information in a header of each leaf of the plurality of decision trees for use in relation with at least one field of a header of a packet, to select at least one rule for classification of the packet. It should be understood that modules in at least one embodiment, also in reference with FIG. 16, can be implemented as a computer program running on the processor 1602.

The invention has been described with reference to particular embodiments. However, it will be readily apparent to those skilled in the art that it is possible to embody the invention in specific forms other than those of the embodiments described above. The described embodiments are merely illustrative and should not be considered restrictive in any way. The scope of the invention is given by the appended claims, rather than the preceding description, and all variations and equivalents that fall within the range of the claims are intended to be embraced therein.

The invention claimed is:

1. A method for packet classification comprising the steps of:
   analyzing packet classification rules to obtain a plurality of categories of rules;
   building a plurality of decision trees, one for each category of rules;
   adding pre-processing information in a header of each leaf of the plurality of decision trees for use in relation with at least one field of a header of a packet, for selecting at least one rule for classification of the packet, said pre-processing information comprising a plurality of sub-rules, disjointed two by two, for matching against a selected field of the header of the packet, each sub-rule comprising a rule constraint on a single field of the rule; and
   applying the sub-rules for matching a plurality of selected fields of the header of the packet before making a full match of the header of the packet against at least one complete rule selected for classification of the packet;
   wherein the at least one complete rule is selected according to at least one positive match between at least one sub-rule, corresponding to the complete rule, and at least one selected field of the header of the packet.

2. The method of claim 1 wherein the step of analysing comprises iteratively analysing the packet classification rules using a variable factor, to obtain the plurality of categories of rules.

3. The method of claim 2, wherein the step of iteratively analysing comprises partitioning a rule-set into subsets which each contain fewer rules than a given threshold.

4. The method of claim 3, wherein the partitioning is done by applying a cutting heuristic.

5. The method of claim 4, wherein the rules with a similar size pattern are grouped in a subset and wherein the subset is associated with a dedicated decision tree.

6. The method of claim 5, wherein the variable factor is a ratio of a range covered by a rule over a range covered by a field.

7. The method of claim 6, wherein the ratio is varied at each iteration until a smaller number of subsets is obtained.

8. The method of claim 1 further comprising the steps of:
receiving a packet for classification;
for each tree, starting at a root of the tree, until a leaf node is reached, iteratively:
comparing the header of the packet to a rule space covered by the node; and
identifying a next node for use in the step of comparing;
comparing the pre-processing information comprised in the header of the leaf node to the at least one field of the header of the packet; and
selecting at least one rule for standard rule matching with the header of the packet, according to at least one positive match between at least one sub-rule and at least one selected field of the header of the packet, for classification of the packet.

9. A computing device for packet classification comprising a processor and memory, said memory containing instructions executable by said processor whereby said computing device is operative to:
analyze packet classification rules to obtain a plurality of categories of rules;
build a plurality of decision trees, one for each category of rules;
add pre-processing information in a header of each leaf of the plurality of decision trees for use in relation with at least one field of a header of a packet, to select at least one rule for classification of the packet, said pre-processing information comprising a plurality of sub-rules, disjointed two by two, for matching against a selected field of the header of the packet, each sub-rule comprising a rule constraint on a single field of the rule; and
apply the sub-rules for matching a plurality of selected fields of the header of the packet before making a full match of the header of the packet against at least one complete rule selected for classification of the packet;
wherein the at least one complete rule is selected according to at least one positive match between at least one sub-rule, corresponding to the complete rule, and at least one selected field of the header of the packet.

10. The computing device of claim 9 wherein the step of analysing comprises iteratively analysing the packet classification rules using a variable factor, to obtain the plurality of categories of rules.

11. The computing device of claim 10, wherein the step of iteratively analysing comprises partitioning a rule-set into subsets which each contain fewer rules than a given threshold.

12. The computing device of claim 11, wherein the partitioning is done by applying a cutting heuristic.

13. The computing device of claim 12, wherein the rules with a similar size pattern are grouped in a subset and wherein the subset is associated with a dedicated decision tree.

14. The computing device of claim 13, wherein the variable factor is a ratio of a range covered by a rule over a range covered by a field.

15. The computing device of claim 14, wherein the ratio is varied at each iteration until a smaller number of subsets is obtained.

16. The computing device of claim 9, wherein the memory contains further instructions executable by said processor and whereby said computing device is further operative to:
receive a packet for classification;
for each tree, starting at a root of the tree, until a leaf node is reached, iteratively:
compare the header of the packet to a rule space covered by the node; and
identify a next node for use in the step of comparing;
compare the pre-processing information comprised in the header of the leaf node to the at least one field of the header of the packet; and
select at least one rule for standard rule matching with the header of the packet, and at least one selected field of the header of the packet, for classification of the packet.

* * * * *